United States Patent
Vos et al.

(10) Patent No.: US 7,302,449 B2
(45) Date of Patent: Nov. 27, 2007

(54) DATABASE MANAGEMENT SYSTEM AND METHOD WHICH MONITORS ACTIVITY LEVELS AND DETERMINES APPROPRIATE SCHEDULE TIMES

(75) Inventors: Melody Vos, Dripping Springs, TX (US); Jeffrey D Slavin, Austin, TX (US)

(73) Assignee: BMC Software, Inc., Houston, TX (US)

( * ) Notice: Subject to any disclaimer, the term of this patent is extended or adjusted under 35 U.S.C. 154(b) by 400 days.

(21) Appl. No.: 11/058,775

(22) Filed: Feb. 16, 2005

(65) Prior Publication Data

US 2005/0160074 A1 Jul. 21, 2005

Related U.S. Application Data

(63) Continuation of application No. 09/990,583, filed on Nov. 21, 2001, now Pat. No. 6,944,630.

(60) Provisional application No. 60/252,873, filed on Nov. 22, 2000.

(51) Int. Cl.
*G06F 17/00* (2006.01)
(52) U.S. Cl. .................. 707/103 R; 707/101; 707/102
(58) Field of Classification Search ..................... None
See application file for complete search history.

(56) References Cited

U.S. PATENT DOCUMENTS

| | | | | |
|---|---|---|---|---|
| 5,327,559 A | * | 7/1994 | Priven et al. | 718/101 |
| 5,590,056 A | * | 12/1996 | Barritz | 702/186 |
| 6,073,110 A | | 6/2000 | Rhodes et al. | |

(Continued)

OTHER PUBLICATIONS

Kenneth W. Ng, Zhenghao Wang, Richard R. Muntz, and Silvia Nittel, "Dynamic Query ReOptimization" In Proceedings of SSDBM, pp. 264-273, 1999.

(Continued)

*Primary Examiner*—Sana Al-Hashemi
(74) *Attorney, Agent, or Firm*—Wong, Cabello, Lutsch, Rutherford & Brucculeri, LLP

(57) ABSTRACT

A system and method for automated database management are provided. Statistics relating to operation of a database may be collected, wherein the database comprises one or more database objects. Characteristics of the database objects may be determined, either automatically or by user intervention, using the collected statistics, one or more policies, and/or one or more definitions. The policies and definitions may be defaults or may be customized by a user. Actions to be performed on the database objects may be determined, either automatically or by user intervention, based on the characteristics of the database objects. A schedule for performing the actions on the database objects may be automatically determined. The actions may be performed on the database objects based on the schedule. The actions on the database objects may be confirmed. The results of the actions on the database objects may be analyzed or monitored. Policies and/or definitions may be reconfigured based on the results. The system and method may automatically decide to perform one or more REORG actions on the database objects based on the statistics. A recommendation of a modification to one or more of the database objects may be generated based on the statistics. The scheduled actions may be modified as a result of detecting a change in the characteristics or usage of at least one of the database objects.

42 Claims, 11 Drawing Sheets

U.S. PATENT DOCUMENTS

| | | |
|---|---|---|
| 6,282,570 B1 | 8/2001 | Leung et al. |
| 6,370,522 B1 | 4/2002 | Agarwal et al. |
| 6,397,359 B1 | 5/2002 | Chandra et al. |
| 2002/0087587 A1 | 7/2002 | Vos et al. |
| 2004/0111441 A1 | 6/2004 | Saito et al. |

OTHER PUBLICATIONS

M. Gillmann, J. Weienfels, G. Shegalov, W. Wonner, and G. Weikum, "A Goal-driven Auto-Configuration Tool for the Distributed Workflow Management System Mentorlite," SIGMOD Record, 29(2):595, 2000.

* cited by examiner

DATABASE MANAGEMENT SYSTEM AND METHOD WHICH MONITORS ACTIVITY LEVELS AND DETERMINES APPROPRIATE SCHEDULE TIMES

CROSS-REFERENCE TO RELATED APPLICATIONS

This application is a continuation of U.S. patent application Ser. No. 09/990,583 filed Nov. 21, 2001 now U.S. Pat. No. 6,944,630, which is incorporated herein by reference and which claims the benefit of U.S. Provisional Application No. 60/252,873 entitled "AUTOMATED DATABASE MANAGEMENT SYSTEM AND METHOD," filed Nov. 22, 2000.

BACKGROUND OF THE INVENTION

1. Field of the Invention

This invention relates generally to computer systems and software. More particularly, the invention relates to management of database systems.

2. Description of the Related Art

The data processing resources of business organizations are increasingly relying on database management systems (DBMS) such as relational database management systems (RDBMS) for their data storage and processing needs. One example of such an RDBMS is "DB2" from International Business Machines. Rapid data growth and the growing complexity of business applications have made the DBMS even more critical to its users than in the past. As a result, organizations that rely on these systems often expect round-the-clock, "24×7" availability as well as nearly instant solutions to the often thorny problems that may arise. Consequently, these organizations need capable DBMS administrators who are able to tackle the problems and get the most out of the DBMS.

The maintenance and management of a DBMS is often complex and fraught with difficulty, especially for organizations with weighty and complex data management needs. Typically, competent DBMS administration requires training and knowledge in the often arcane and esoteric details of commercial products such as DB2, DB2 management tools, and countless other DBMS solutions, tools, and utilities. DBMS maintenance and management also typically requires manual intervention by a skilled administrator to conduct various DBMS management tasks. As the demand for DBMS solutions increases, however, the supply of capable DBMS administrators has not increased accordingly. Therefore, many organizations that rely on DBMS solutions for their business needs are understaffed at this critical position.

One approach towards this problem might include automating various elements of database administration so that the process demands less skill on an administrator's behalf. Such a solution might also include management tools that can be used "out of the box" and with minimal configuration. The solution might assist the user in combating common problems such as tablespace growth, storage fragmentation, page splits, changes in the data distribution (cardinality), changes in the cluster ratio, free space, and hot spots.

Therefore, it is desirable to provide an improved system and method for database management.

SUMMARY OF THE INVENTION

The present invention provides various embodiments of a method and system for automated database management. Various embodiments of the system and method for automated database management may be referred to herein as an "Object Advisor." The Object Advisor may identify conditions that cause performance or availability problems in database objects. It may then plan, execute, and manage maintenance activities to correct those conditions. Object Advisor may also prioritize the maintenance tasks and optimizes utility parameters and maintenance processing to ensure that the customers' resources are used in the most effective way possible while ensuring that the most critical problems are addressed first.

One embodiment may provide a database management system and method which collects statistics and automatically determines and schedules appropriate actions based on the statistics. In one embodiment, statistics relating to operation of a database may be collected, wherein the database comprises one or more database objects. The statistics may include, for example, object-level statistics and/or activity-level statistics. Characteristics of the database objects may be automatically determined. In one embodiment, automatically determining characteristics of the database objects may include automatically determining characteristics of the database objects using the collected statistics, one or more policies, and/or one or more definitions. The policies and definitions may be defaults or may be customized by a user. Actions to be performed on the database objects may be automatically determined based on the automatically determined characteristics of the database objects. A schedule for performing the actions on the database objects may be automatically determined. In one embodiment, the actions may be performed on the database objects based on the schedule. The performing the actions on the database objects may be confirmed. The results of the actions on the database objects may be analyzed or monitored. Policies and/or definitions may be reconfigured based on the analyzing the results of the performing the scheduled actions on the database objects.

One embodiment may provide a database management system and method which automatically schedules and performs actions and monitors results. In one embodiment, statistics relating to operation of a database may be collected, wherein the database comprises one or more database objects. Characteristics of the database objects may be determined either automatically or by intervention of a user. Actions to be performed on the database objects may be determined, either automatically or by intervention of a user, based on the characteristics of the database objects. A schedule for performing the actions on the database objects may be automatically determined. In one embodiment, the actions may be performed on the database objects based on the schedule. The performing the actions on the database objects may be confirmed. The results of the actions on the database objects may be analyzed or monitored. Policies and/or definitions may be reconfigured based on the analyzing the results of the performing the scheduled actions on the database objects.

One embodiment may provide a database management system and method which monitors activity levels and determines appropriate schedule times. In one embodiment, statistics relating to operation of a database may be collected, wherein the database comprises one or more database objects. The statistics may include, for example, object-level statistics and/or activity-level statistics. The activity-level statistics may measure a level of activity or usage of the one or more database objects. Characteristics of the database objects may be determined either automatically or by intervention of a user. Actions to be performed on the database objects may be determined, either automatically or by intervention of a user, based on the characteristics of the database objects. A schedule for performing the actions on the database objects may be automatically determined based on the activity-level statistics. In one embodiment, the actions may be performed on the database objects based on the schedule. The performing the actions on the database objects may be confirmed. The results of the actions on the database objects may be analyzed or monitored.

One embodiment may provide a database management system and method which monitors action results and adjusts user parameters in response. In one embodiment, actions to be performed on the database objects may be determined, either automatically or by intervention of a user, based on the characteristics of database objects, wherein a database comprises one or more database objects. The actions may be performed on the database objects based on the schedule. The results of the actions on the database objects may be analyzed or monitored. One or more policies or definitions may be reconfigured based on the monitoring the results of the performing the actions on the database objects.

One embodiment may provide a database management system and method which determines space efficiency of objects and initiates database reorganizations. In one embodiment, statistics relating to operation of a database may be collected, wherein the database comprises one or more database objects, and wherein the statistics comprise statistics regarding use of storage space by the database objects. The system and method may automatically decide to perform one or more REORG actions on the database objects based on the statistics. A REORG engine may be instructed to perform the REORG actions.

One embodiment may provide a database management system and method which recommends changes in physical characteristics of objects and partition changes. In one embodiment, statistics relating to operation of a database may be collected, wherein the database comprises one or more database objects. A recommendation of a modification to one or more of the database objects may be generated based on the statistics. The modification may include, for example, a new partition, a new key, or a another physical change to one of the database objects. The recommended modification may be performed on one or more of the database objects.

One embodiment may provide a database management system and method which includes adaptive management of database objects. In one embodiment, statistics relating to operation of a database may be collected, wherein the database comprises one or more database objects. Characteristics and usage of the database objects may be determined. Actions to be performed on the database objects may be determined based on the characteristics of the database objects. A schedule for performing the actions on the database objects may be determined based on the usage of the database objects. A change may be detected in the characteristics or usage of at least one of the database objects. The scheduled actions may be modified as a result of the change in the characteristics or usage of at least one of the database objects.

BRIEF DESCRIPTION OF THE DRAWINGS

The objects and advantages of the invention will become apparent upon reading the following detailed description and upon reference to the accompanying drawings in which.

Figure 1:
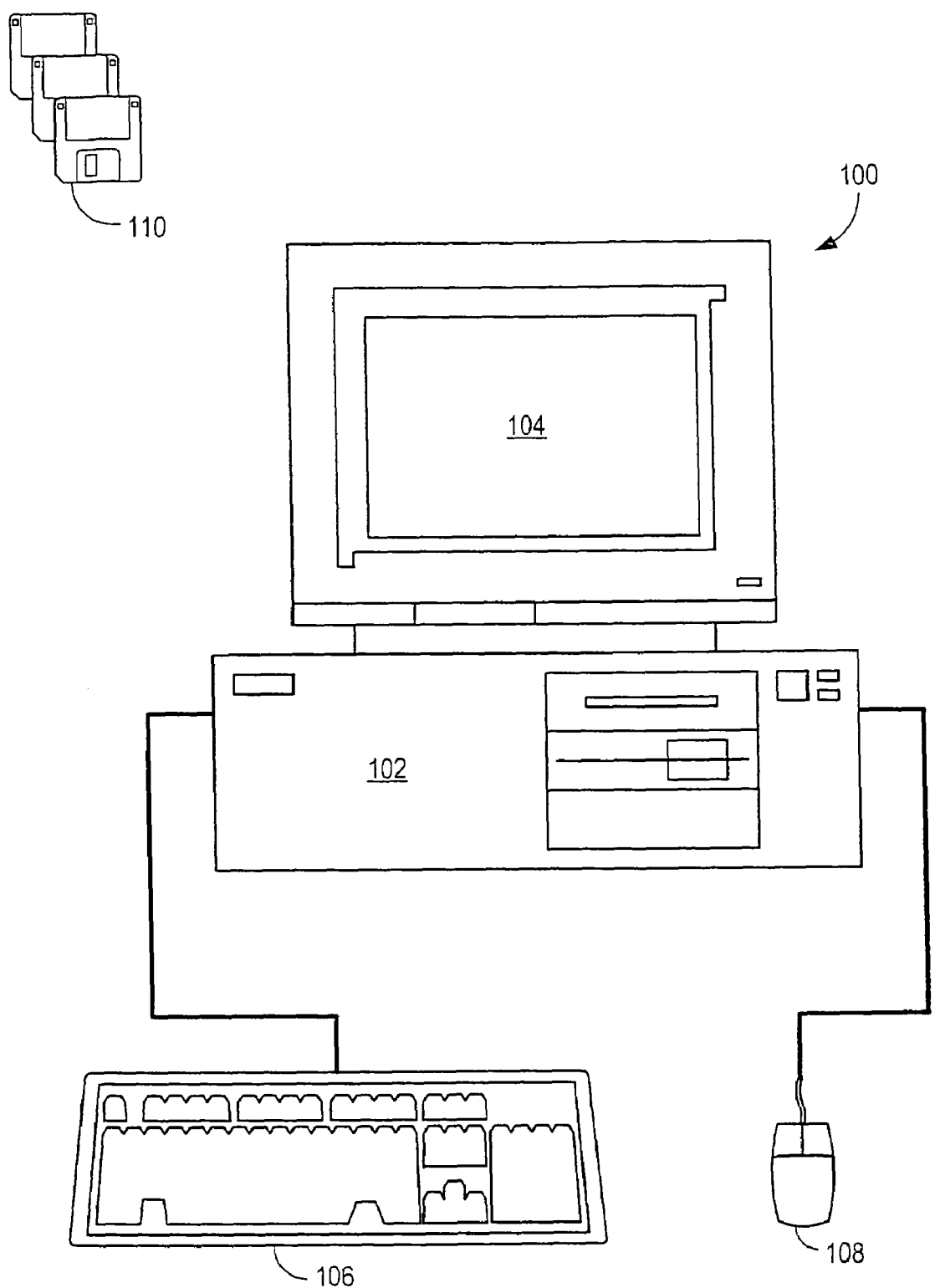
FIG. 1 illustrates a computer system which is suitable for implementing a database management system and method according to several embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

FIG. 1—A Typical Computer System

FIG. 1 illustrates a typical, general-purpose computer system 100 which is suitable for implementing a database management system and method according to one embodiment. The computer system 100 typically comprises components such as computing hardware 102, a display device such as a monitor 104, an alphanumeric input device such as a keyboard 106, and optionally an input device such as a mouse 108. The computer system 100 is operable to execute computer programs which may be stored on disks 110 or in computing hardware 102. In various embodiments, the computer system 100 may comprise a desktop computer, a laptop computer, a palmtop computer, a network computer, a personal digital assistant (PDA), an embedded device, a smart phone, or any other suitable computing device.

Figure 2:
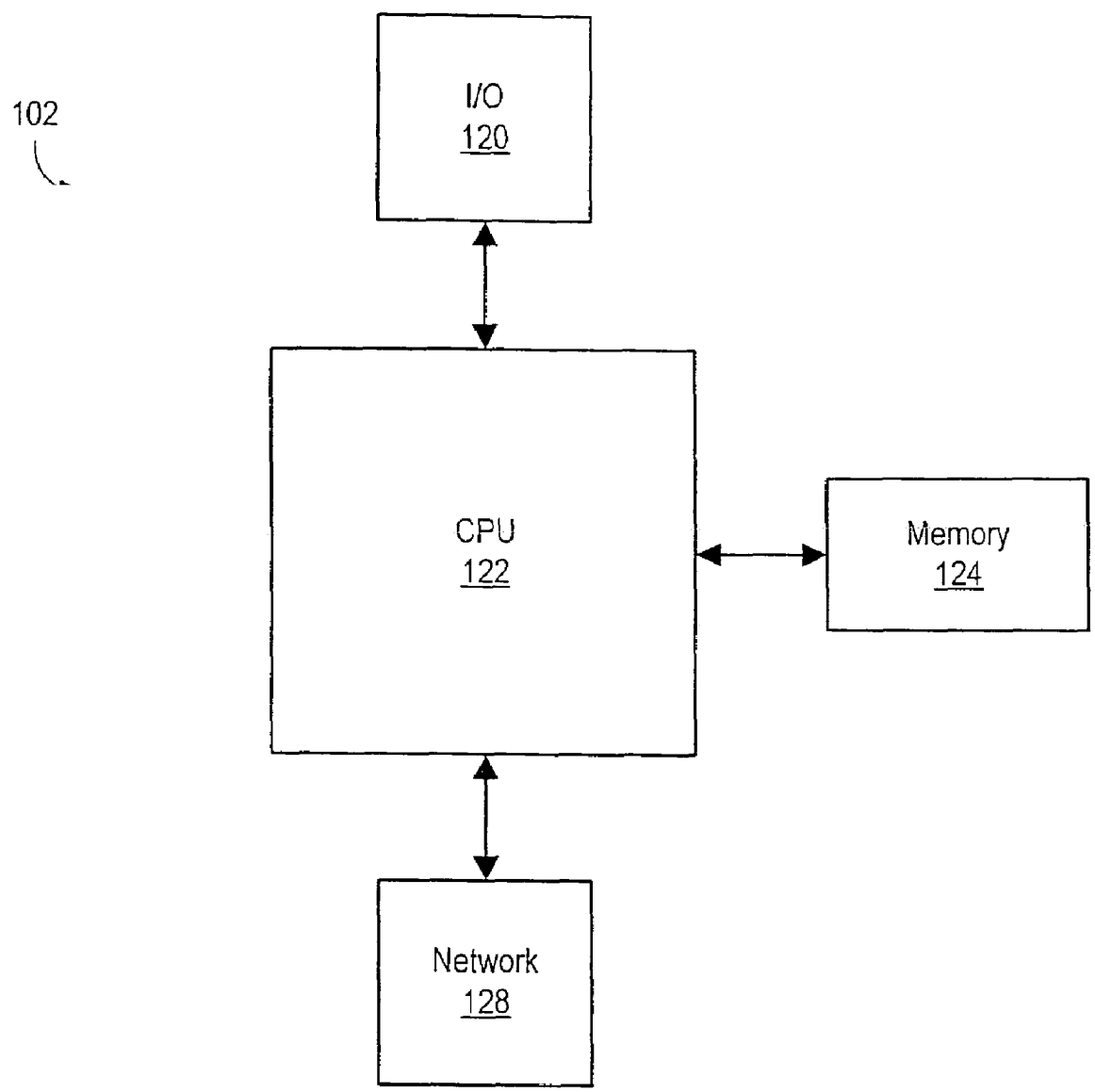
FIG. 2 is a block diagram of the computer system of FIG. 1 which is suitable for implementing a database management system and method according to several embodiments.

FIG. 2—Computing Hardware of a Typical Computer System

FIG. 2 is a block diagram illustrating the computing hardware 102 of a typical, general-purpose computer system 100 which is suitable for implementing a database management system and method according to one embodiment. The computing hardware 102 includes at least one central processing unit (CPU) or other processor(s) 122. The CPU 122 is configured to execute program instructions which implement the improved management console as described herein. The CPU 122 is preferably coupled to a memory medium 124.

As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory. The memory medium 124 may therefore store program instructions and/or data which implement the database management system and method as described herein. Furthermore, the memory medium 124 may be utilized to install the program instructions and/or data. In a further embodiment, the memory medium 124 may be comprised in a second computer system which is coupled to the computer system 100 through a network 128. In this instance, the second computer system may operate to provide the program instructions stored in the memory medium 124 through the network 128 to the computer system 100 for execution.

The CPU 122 may also be coupled through an input/output bus 120 to one or more input/output devices that may include, but are not limited to, a display device such as a monitor 104, a pointing device such as a mouse 108, a keyboard 106, a track ball, a microphone, a touch-sensitive display, a magnetic or paper tape reader, a tablet, a stylus, a voice recognizer, a handwriting recognizer, a printer, a plotter, a scanner, and any other devices for input and/or output. The computer system 100 may acquire program instructions and/or data for implementing the database management system and method as described herein through the input/output bus 120.

The CPU 122 may include a network interface device 128 for coupling to a network. The network may be representative of various types of possible networks: for example, a local area network (LAN), wide area network (WAN), or the Internet. The improved management console as described herein may therefore be implemented on a plurality of heterogeneous or homogeneous networked computer systems such as computer system 100 through one or more networks. Each computer system 100 may acquire program instructions and/or data for implementing the database management system and method as described herein over the network.

Figure 3:
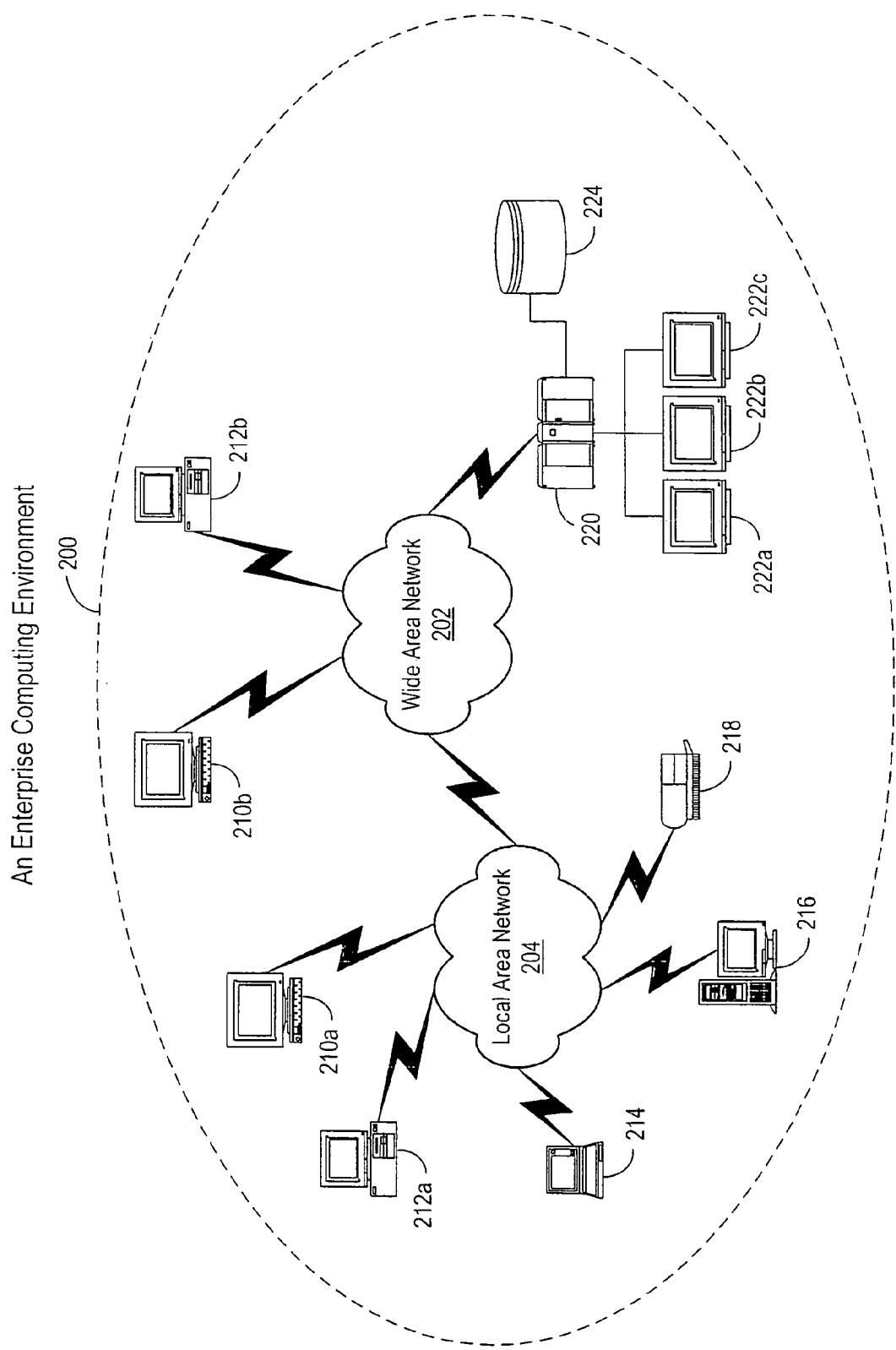
FIG. 3 illustrates an enterprise computing environment which is suitable for implementing a database management system and method according to several embodiments.

FIG. 3—A Typical Enterprise Computing Environment

FIG. 3 illustrates an enterprise computing environment 200 according to one embodiment. An enterprise 200 comprises a plurality of computer systems such as computer system 100 which are interconnected through one or more networks. Although one particular embodiment is shown in FIG. 3, the enterprise 200 may comprise a variety of heterogeneous computer systems and networks which are interconnected in a variety of ways and which run a variety of software applications.

One or more local area networks (LANs) 204 may be included in the enterprise 200. A LAN 204 is a network that spans a relatively small area. Typically, a LAN 204 is confined to a single building or group of buildings. Each node (i.e., individual computer system or device) on a LAN 204 preferably has its own CPU with which it executes computer programs, and often each node is also able to access data and devices anywhere on the LAN 204. The LAN 204 thus allows many users to share devices (e.g., printers) as well as data stored on file servers. The LAN 204 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). FIG. 3 illustrates an enterprise 200 including one LAN 204. However, the enterprise 200 may include a plurality of LANs 204 which are coupled to one another through a wide area network (WAN) 202. A WAN 202 is a network that spans a relatively large geographical area.

Each LAN 204 comprises a plurality of interconnected computer systems or at least one computer system and at least one other device. Computer systems and devices which may be interconnected through the LAN 204 may include, for example, one or more of a workstation 210a, a personal computer 212a, a laptop or notebook computer system 214, a server computer system 216, or a network printer 218. An example LAN 204 illustrated in FIG. 3 comprises one of each of these computer systems 210a, 212a, 214, and 216 and one printer 218. Each of the computer systems 210a, 212a, 214, and 216 is preferably an example of the typical computer system 100 as illustrated in FIGS. 1 and 2. The LAN 204 may be coupled to other computer systems and/or other devices and/or other LANs 204 through a WAN 202.

A mainframe computer system 220 may optionally be coupled to the enterprise 200. As shown in FIG. 3, the mainframe 220 is coupled to the enterprise 200 through the WAN 202, but alternatively the mainframe 220 may be coupled to the enterprise 200 through a LAN 204. As shown in FIG. 3, the mainframe 220 is coupled to a storage device or file server 224 and mainframe terminals 222a, 222b, and 222c. The mainframe terminals 222a, 222b, and 222c access data stored in the storage device or file server 224 coupled to or comprised in the mainframe computer system 220.

The enterprise 200 may also comprise one or more computer systems which are connected to the enterprise 200 through the WAN 202: as illustrated, a workstation 210b and a personal computer 212b. In other words, the enterprise 200 may optionally include one or more computer systems which are not coupled to the enterprise 200 through a LAN 204. For example, the enterprise 200 may include computer systems which are geographically remote and connected to the enterprise 200 through the Internet.

Figure 4:
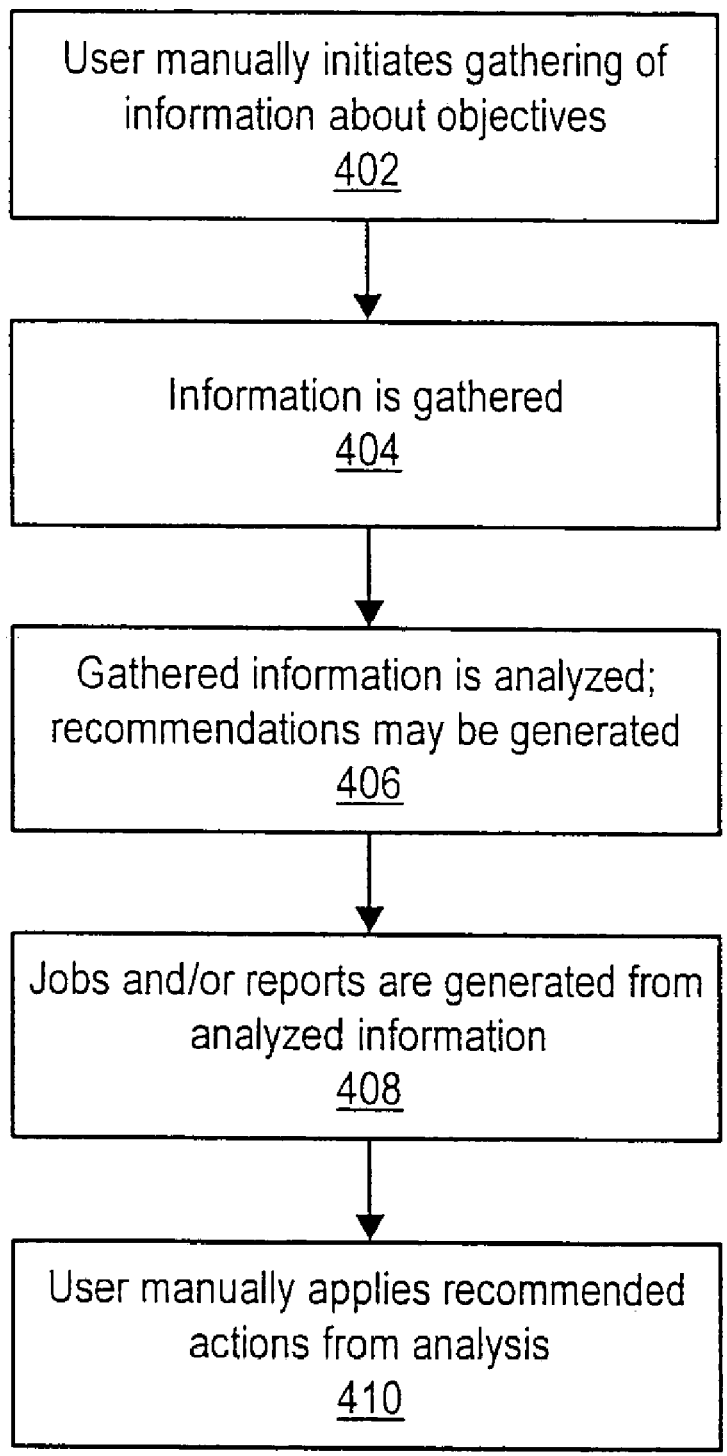
FIG. 4 illustrates a method for database management according to the prior art.

FIG. 4—A Database Management Method from the Prior Art

FIG. 4 illustrates a method for database management according to the prior art. This prior art method requires substantial manual intervention by a user such as a highly skilled database administrator. In 402, the user manually initiates the gathering of information about objectives. Objectives may relate to computer system resource usage parameters such as CPU time, "real-world" time, and storage utilization, for example. In 404, the information is gathered using the prior art database management software.

In 406, the information is analyzed, typically by the prior art database management software. The software may generate recommendations based on the analysis. In 408, jobs and/or reports may be generated by the prior art database management software based on the analysis.

In 410, the user may manually apply the recommended actions to improve the performance of the DBMS or otherwise meet the desired objectives.

Figure 5:
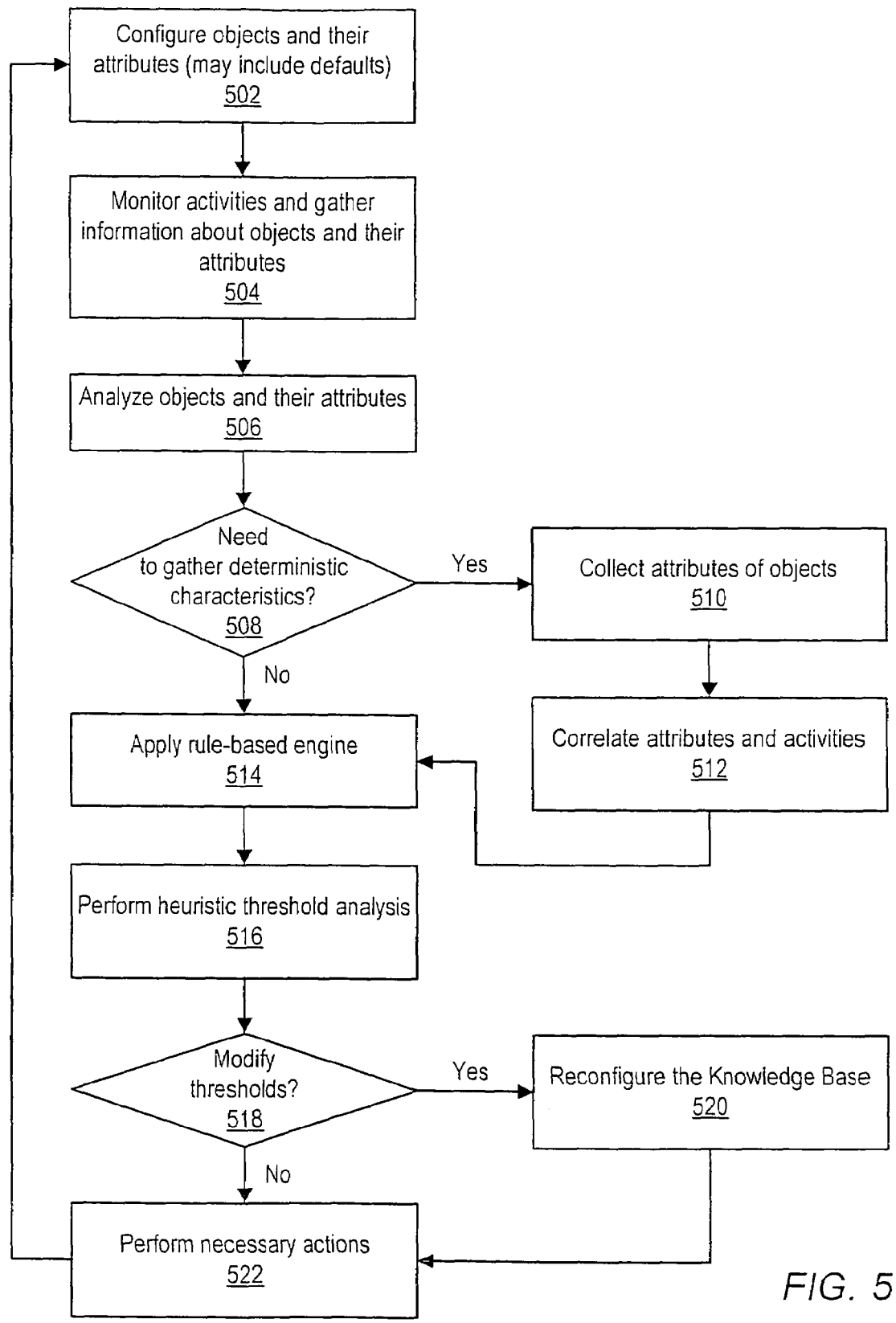
FIG. 5 illustrates a method for automated and intelligent database management according to several embodiments.

FIG. 5—An Automated and Intelligent Database Management Method

FIG. 5 illustrates a method for automated and intelligent database management according to several embodiments. A computer system architecture for performing this method is described with reference to FIG. 6. Various embodiments of the system and method for automated database management may be referred to herein as an "Object Advisor." Various of these embodiments of the Object Advisor and its components are described in more detail as follows. The Object Advisor Solution Set may identify conditions that cause performance or availability problems in data base objects. It may then plan, execute, and manage maintenance activities to correct those conditions. Object Advisor may also prioritize the maintenance tasks and optimizes utility parameters and maintenance processing to ensure that the customers' resources are used in the most effective way possible while ensuring that the most critical problems are addressed first.

In 502, database objects and their attributes may be configured. In one embodiment, the configuration may include setting default values (e.g., resource usage thresholds for generating alerts) upon installation of the database management software. The use of defaults may reduce the level of skill necessary for the user.

In 504, database activities are monitored, and information about database objects and their attributes may be gathered by the database management software.

In 506, database objects and their attributes may be analyzed by the database management software.

In 508, it may be determined whether deterministic characteristics should be gathered. If so, then in 510 attributes of database objects may be collected, and in 512 the attributes and activities may be correlated.

In 514, a rule-based engine may be applied to the analyzed information (including the correlated attributes and activities, if applicable).

In 516, heuristic threshold analysis may be performed.

In 518, it may be determined whether thresholds should be modified. If so, then in 520 the knowledge base may be reconfigured with the modified thresholds.

In 522, any actions such as recommendations may be performed on the database objects or other relevant subsystems.

Figure 6:
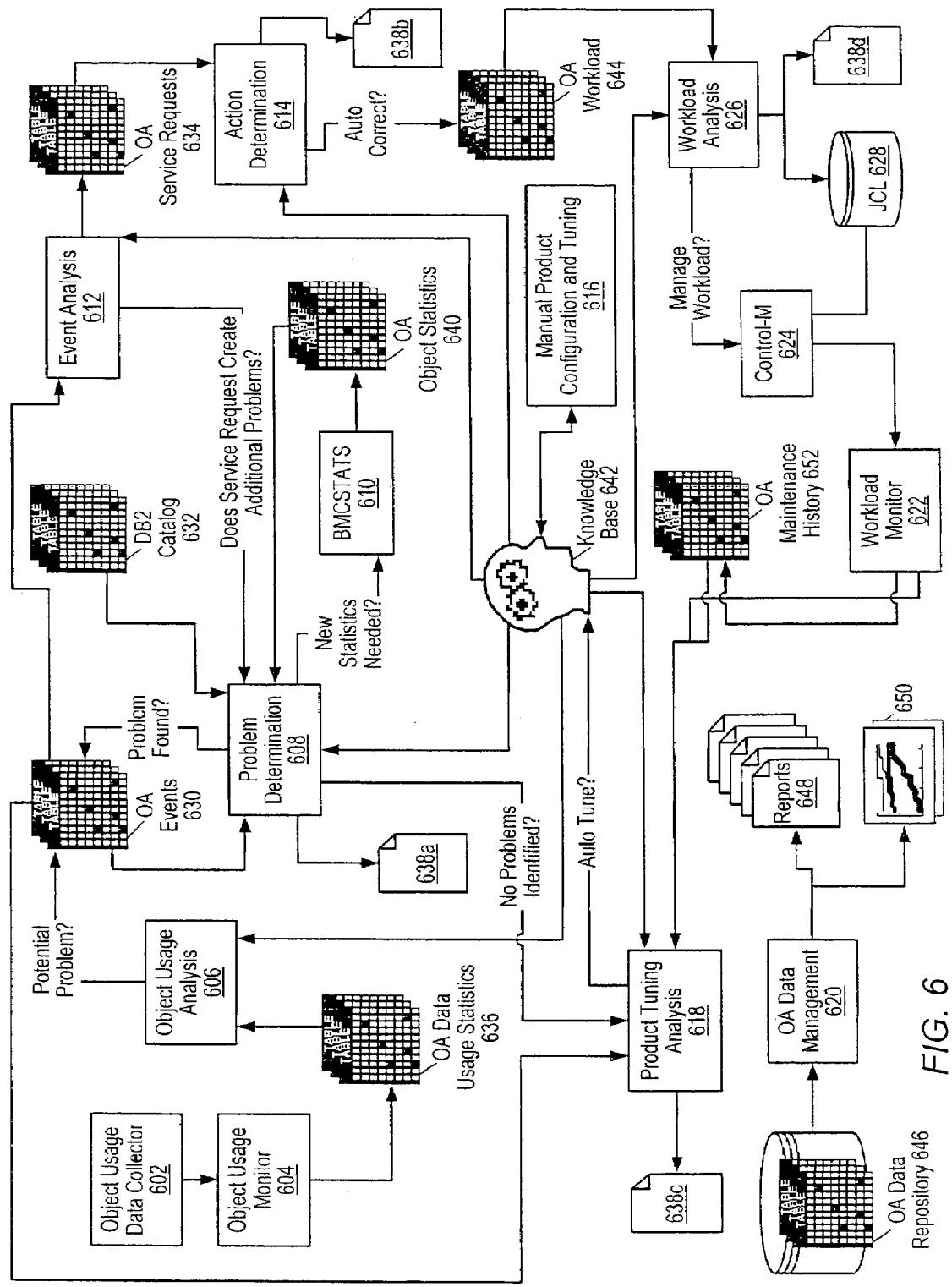
FIG. 6 illustrates an architecture for a system for automated and intelligent database management according to several embodiments.

FIG. 6—An Automated and Intelligent Database Management Architecture

FIG. 6 illustrates an architecture for a system for automated and intelligent database management according to several embodiments. In various embodiments, the Object Advisor may be executable in whole or part on a mainframe computer system 220. Throughout the following description, DB2 is used as an example of one DBMS to which Object Advisor may be applied; in other embodiments, Object Advisor may be executable to manage other database management systems.

In one embodiment, there are four general categories of components contained in the Object Advisor solution set: Data Collection Components, Decision Making Components, Execution Management Components, User Interface and Configuration Components. In one embodiment, the Object Advisor components are designed in a modular manner to enable them to be packaged in various ways to solve related problems in other solution sets as well. For example, the Object Advisor solution set may solve the problem of managing the desired state of Database objects. When the Data Collection, Decision Making, and Configuration components from Object Advisor are employed together, an organization may have the ability to determine object-related causes of general performance problems such as application response time has slowed. Adding the Object Advisor Execution components may enable an organization not only to correct the problem, but also to verify that the actions taken actually made a difference in the performance of that same application.

Data Collection Components

In one embodiment, the Data Collection components may utilize high-speed collection techniques to gather information about database objects such as Database objects. This information describes the physical aspects of database objects and how the data within those objects is utilized. Object Advisor may use the collected data for decision-making and reporting purposes. The object usage data collector 602 may be used for data collection.

Object Usage Monitor and Analysis

In one embodiment, the object usage monitor 604 may execute continually and track information about how specific database objects are used. Information about the type of activities that occur, how frequently they occur, and when they occur is collected and saved. The usage monitor may 604 also identify the type of access that is used to retrieve data from specific datasets. The usage monitor may log the collected information to an OA (Object Advisor) data usage statistics table 636. The object usage analysis component 606 may be used to correlate the usage data relative to object-level performance metrics. Potential problems may be logged to an events table 630. Correlation may provide targeted analysis allowing for a proactive, efficient solution that is scalable to very large environments.

Object Statistics Collector

An object statistics collector such as BMCSTATS 610, available from BMC Software, Inc., may collect detailed statistical information about database objects. The collection can be zoomed in to specific types of statistics and can be collected in a real-time manner or as a part of a scheduled process. The statistical information collected by this component 610 describes the physical characteristics of database objects and is saved for historical and analytical purposes in the Object Advisor repository tables such as object statistics table 640. In one embodiment, the most common data provided by the object statistics collector 610 includes space and access-path statistics that can be placed in the DB2 catalog in lieu of RUNSTATS data. The data provided by this component may enable Object Advisor to determine whether performance or availability problems exist on specific database objects. It may enable the pinpointing of which objects require attention and how urgently that attention is required.

Problem Determination Components

The problem determination components, including problem determination component 608, may evaluate information about the usage of database objects for indications of potential performance or availability concerns. When concerns are identified, detailed statistics may be requested and analyzed to determine whether an actual problem exists and what actions would be required to correct it.

Problem Determination

The problem determination component 608 may analyze object usage and statistical information looking for performance, availability, or other object related problems that could impact the use of database object data. The problem determination component may use information from tables such as the events table 630 and a DBMS (such as DB2) catalog table 632. The event analysis component 612 may provide similar functionality for events. Information describing any problem that is found and the object it affects, and the remedy required to correct the situation, may be logged in the repository tables and/or files 638. This data may also be consumed by the action determination components. The problem determination component 608 may isolate performance and availability problems and identify the appropriate reaction by drawing on an established knowledge base. The decision-making capabilities provided in this component 608 may reduce the level of experience required by the user.

Threshold Adjustment

The product tuning analysis component 618 may manage and automatically adjust the thresholds used to monitor data usage and the thresholds used in problem determination. This component may use information from Object Advisor repository tables such as a maintenance history table 652, for example. This component may enable the Object Advisor to tweak thresholds as needed to ensure the effectiveness of the problem determination components. The ability to govern its own thresholds may enable Object Advisor to identify problems at the appropriate time and severity. Therefore, as database objects or applications change, users may not need to reconfigure Object Advisor. The decision-making capability provided in this component may reduce the level of experience required by the user. In one embodiment, thresholds and other configuration settings may be manually tuned by a user with the manual product configuration and tuning component 616.

Action Determination Components

When a condition is identified by the problem determination component or other piece of software, the Action Determination components may identify the corresponding action for the condition. The identified actions may then be used to construct, prioritize, and optimize a workload that can be built and managed by the execution management components.

Action Determination

The action determination component 614 may analyze the remedy recommended during problem determination and identify the various utilities, commands, and/or programs that perform that service. It may then determine the most effective action for correcting the problem and whether any additional actions should be performed to prevent new or associated problems from occurring. The action determination component may also construct the corresponding maintenance workload(s) in workload table 644 and assign priorities to individual units of work based on the severity of the underlying object condition. The action determination component may use information from tables such as a service requests table 634. The data provided by this component 614 may be consumed by the workload optimization components.

The ability to automatically determine the most effective approach to correcting a problem and to identify the objects most in need of repair may reduce human interaction. This capability may be especially important in large enterprises. The decision-making capability provided in this component 614 may reduce the level of experience required by the user.

Workload Optimizer

The workload analysis component 626 may analyze the DBMS batch workload and modify it as needed for efficiency. In one embodiment, utility options are tuned, duplicate tasks are identified, grouping and parallelism options are analyzed, and dependencies within the unit of work are noted. The workload is then modified as needed before it is registered with the scheduling component 624. Optimizing the workload may reduce the elapsed time of maintenance tasks while maximizing system resources. This may be especially important in large enterprises. The decision-making capability provided in this component may reduce the level of experience required by the user.

Execution Management Components

The Execution Management Components may build, manage and execute the requested workload, thereby ensuring that customer resources are used effectively and that maximum throughput is achieved. The components described below may be included in this area of the Object Advisor.

Workload Preparation

The workload monitor component 622 may use the information provided by the workload analysis component 626 and the resource estimation component to register work to the scheduler 624. It may convert the workload into jobs and describe resource constraints, dependencies, priorities, and window constraints to the scheduling component. The workload monitor component 622 may automate the registry of complex dependencies and resource requirements, thereby enabling the workload to be automatically managed for the user.

Resource Estimation

These components (not shown) may estimate the resources that will be required for each specific task in the maintenance workload. Estimated elapsed time may be calculated, and dataset sizes and device requirements are calculated for storage devices. This information may be consumed by the workload monitor component 622 when registering work to the scheduler 624. Performing resource estimation may reduce the level of experience required by the user and ensure the reliable execution of maintenance tasks.

JCL Generation

The JCL 628 generation component (not shown) may be used to create the JCL and jobs required to execute the workload. This may include single-step worklist format jobs, traditional JCL to be managed by the user, and JCL that can be managed by a scheduling component 624. Automating the creation of JCL 628 may reduce the level of experience required by the user and ensure the reliable execution of maintenance tasks.

Scheduling Component

The scheduling component 624, such as Control-M available from BMC Software, Inc., may manage the entire workload. This component may consider priorities, resource requirements, resource availability, and dependencies while determining which tasks to initiate. The scheduling component may initiate multiple tasks in parallel (within and across the sysplex) as determined by dependency and resource requirements. This component may automatically manage maintenance tasks within a batch window, thereby optimizing system resource usage and maximizing throughput.

Execution

The execution component (not shown) may enable the Object Advisor to automate error handling, to ensure that objects are left in a usable state, and to invoke the appropriate utility or command program. This component may also capture information regarding the resources consumed, return codes, and elapsed time of the utility. This information may be related to the object being operated on and logged into the repository tables 646. Automated error handling may ensure the availability of critical applications.

Status Handling and Reporting

This component (not shown) may monitor the completion of tasks and perform cleanup processing in the repository tables 646. Tasks may be marked as complete, tasks that are not required may be identified, data usage counters may be reset as needed, and information may be logged into the history tables. This component may also identify objects that need to be incorporated into end of the window jobs based on work that completes successfully. The ability to report task status and consolidate specific work into end of the window jobs may reduce the elapsed time of maintenance tasks while maximizing system resources.

User Interface and Product Configuration Components

The User Interface may provide an interactive method of driving and customizing the solution set. It may enable the user to view, modify and save predefined options, default values, and rules. These components may also enable users to create their own options, defaults, and rules. In one embodiment, the data managed within the configuration components may be employed by other Object Advisor components to determine how various objects and actions should be managed. Specific configuration components may be described below.

Application Definition

This component (not shown) may provide a facility for logically grouping database objects together. A definition may include a set of rules which, when applied to the DBMS catalog, results in a list of Database objects. The rules that define the logical grouping of objects may be given a name (e.g., the application name) and stored in the Object Advisor Repository 646. Object Advisor may use Application Definitions to implement policies regarding Utility Automation.

Utility Specification and Generation

This component (not shown) may provide a facility for registering utilities, commands, or programs and for specifying how specific actions should be executed. Utility programs and commands may be automatically registered with the Object Advisor at installation time. Through this facility, users may also register other executable programs, thereby enabling them to be invoked within an ad-hoc job stream, or as a part of the automation process.

Task Configuration

The Task configuration component (not shown) may provide a facility for coupling multiple utilities, commands, or programs into a single unit of work. Options related to how the specific utilities in the task list should be initiated may also be defined in the task configuration components. These options may include parallelism, grouping, and conditional execution options for the various utilities in the list. The Object Advisor decision-making components may use the task related definitions to determine how to construct job streams when correcting specific performance problems.

Policy Definition Editors

The policy definition editors (not shown) may provide facilities for defining and implementing policies. As used herein, the term "policies" include rules that may govern how objects and actions are managed by components. Policies may be established for all decisions made within the solution set. They may be specialized towards DBMS object and maintenance management and instruct the product regarding what to do, when to do it, and how to do it.

Scheduling Resource Definition

The scheduling resource definition components (not shown) may provide a means of specifying limits to the resources, such as tape devices, that may be used when executing maintenance tasks. This component may also enable the customer to indicate windows in which specific utilities may execute or windows in which specific objects may or may not be operated on. The data managed by the scheduling resource definition components may be used to register workload requirements to the Execution Components.

Statistics Management

The statistics management components (not shown) may facilitate the migration, cleanup, and summarization of historical statistics data. Detailed object and data usage statistics may be summarized, or consolidated, into specific time intervals, thereby allowing the customer to maintain a longer history of information without the space requirements associated with detailed historical data. Old or outdated information may also be purged from the repository tables. In addition, these components may facilitate the migration of object statistics from one subsystem to another as well as enabling migration between the repository tables and the DBMS catalog. Managing statistics for the user may ensure that accurate sets of statistical data are available for decision-making and reporting purposes. The migration of catalog statistics may enable users to automatically simulate production environments in test systems.

Predefined Policies and Configuration

In one embodiment, Object Advisor may be installed with a complete set of definitions and policies that may constitute "best-practice" techniques regarding DBMS object maintenance. These definitions and policies may be stored in a knowledge base 642. The user may view or customize these policies and definitions as needed to meet shop standards or individual requirements. The user may also create new policies and/or definitions as needed. The knowledge provided in these definitions may reduce the level of experience required by the user.

Catalog Browser

This component (not shown) may provide an ad-hoc means for a user to interactively display lists of database objects. One or more objects on a list may be selected and used to launch an Object Advisor task or action. It may also facilitate the object to action approach for the user interface. This functionality may enable the user to access Object Advisor configuration data more efficiently.

Space Estimation

This component (not shown) may provide an ad-hoc means for a user to interactively determine the space required for database objects. This functionality may enable users to precisely calculate storage requirements for database objects.

Graphing, Reporting, and Trend Analysis

This set of visualization and data management components 620 may enable the detailed and historical data usage statistics and object statistics to be viewed in a meaningful way. Various graphs and reports may be provided to highlight problems and trends regarding the performance and usage of database objects. Reports 648 and graphs 650 may provide a communication vehicle for complex numerical data.

Object Optimization Solutions Based on Object Advisor Technology

The components, architectures, methods, and systems discussed above may provide the basis for other object-related performance solutions. In one embodiment, the previously discussed solution set may be focused on managing the desired state of database objects by watching for problems and correcting them. Additional Object Optimization solutions may proactively search for changes that can be made to improve the performance of database objects. The following are some of the components that may be included in various embodiments of the Optimization Solution.

Partition Advisor

Object Advisor's Optimization Solution may identify object partitions that are approaching a maximum data set size. To ensure that applications will be able to continue processing, it is recommended that the data in the full partition be spread across multiple partitions. Object Advisor may analyze the number and size of existing partitions and determine whether to spread the data across existing datasets or whether a new dataset should be created to hold a portion of the data. Column distribution statistics may also be analyzed to calculate a new key range for the data. Object Advisor may also identify partitions that are accessed more heavily or contain significantly more data than others. When this occurs, the partitions may be analyzed to determine the best method of balancing the data among the partitions.

Dataset Placement Advisor

Object Advisor's Optimization Solution may identify datasets that should not be located on the same DASD volumes. These datasets may be physically related, logically related, or otherwise heavily accessed datasets. Information may be recorded in the Object Advisor repository to indicate where specific dataset should or should not be placed. This information may be recorded and used when datasets are redefined during REORG or other processes. In one embodiment, object Advisor may also relocate datasets that are currently in contention on a DASD device.

Free Space Advisor

Object Advisor's Optimization Solution may identify hotspots (a clustering of insert/update activity) in data objects that are disorganized. This information may be passed to a REORG utility, thereby enabling it to place the free space more effectively. In one embodiment, Object Advisor may monitor objects to determine whether they are being reorganized too frequently. When this occurs, trend analysis may be performed to calculate new free space values that will lessen the frequency of REORG operations. In addition, new space allocation values may be calculated taking the modified free space into account. A workload script may then be written to redefine and reorganize the datasets.

Compression Advisor

The Compression Analysis component of the Object Advisor Optimization Solution may determine the effectiveness of existing data compression. If not enough compression is received, or processing costs are too high, compression may be turned off. In addition, Object Advisor may analyze statistical column information and recommend or enable compression for objects that would benefit. Object Advisor may then determine the most effective compression algorithm for specific objects based on the data contained in the database and how it is used.

FIG. 7—An Automated and Intelligent Database Management Method

Figure 7A:
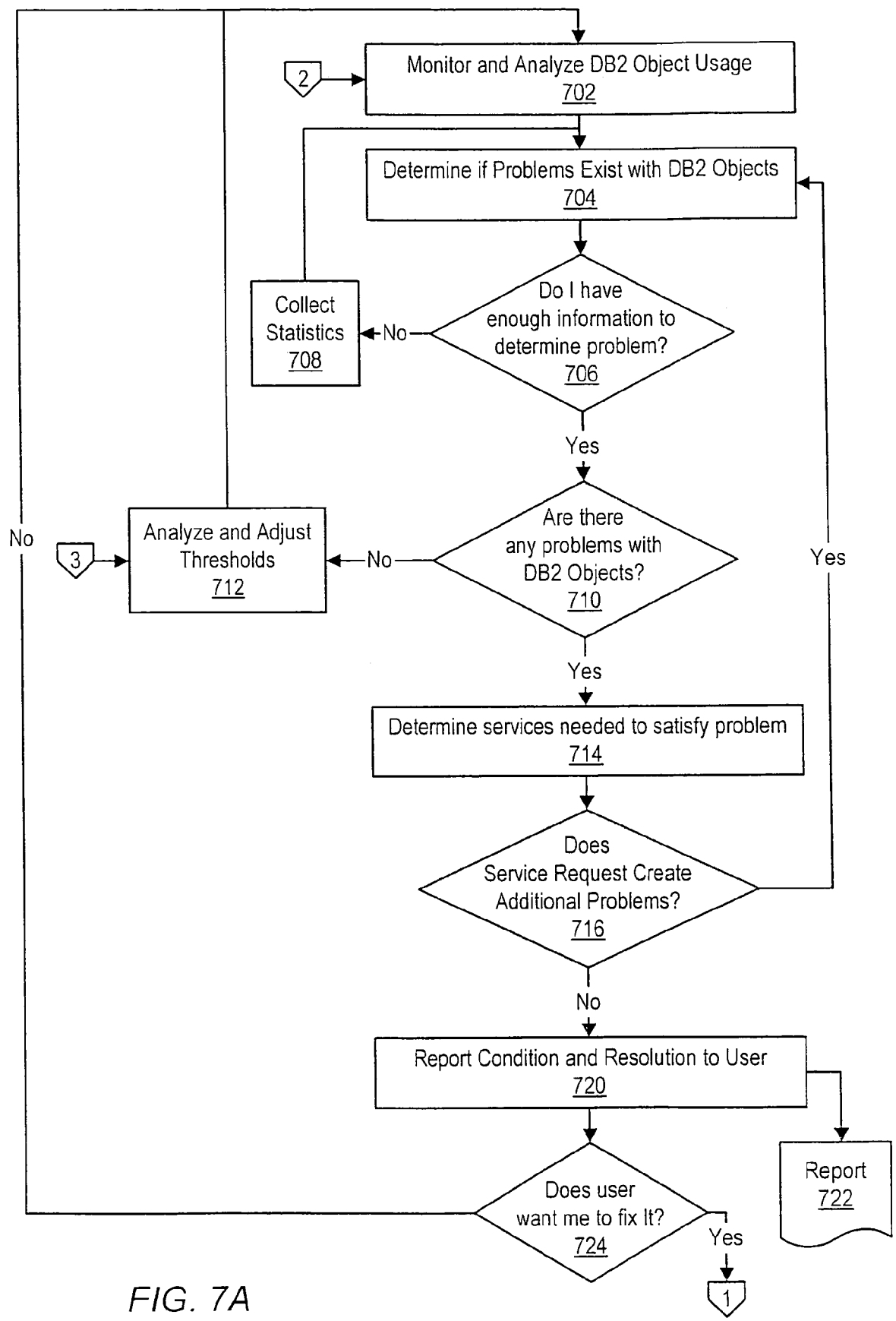
FIGS. 7a and 7b are flowcharts illustrating an automated and intelligent database management method according to several embodiments.
Figure 7B:
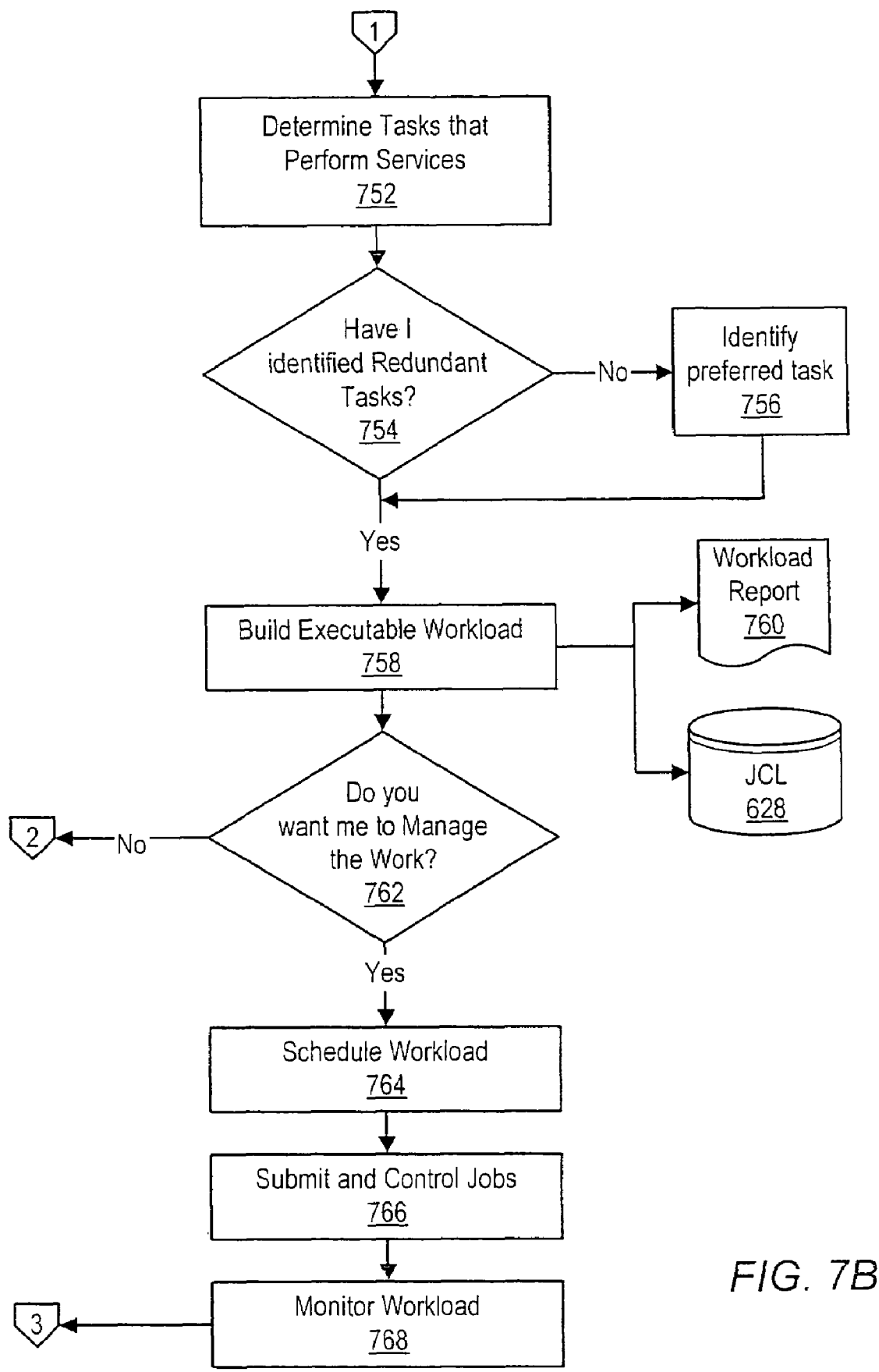

FIGS. 7a and 7b are flowcharts illustrating an automated and intelligent database management method according to several embodiments. FIG. 7a illustrates an analysis phase of the database management method.

In 702, the DBMS may be monitored and analyzed as discussed with reference to FIG. 6.

In 704, problems with database objects (e.g., DB2 objects) may be identified. In 706, if it is determined that there is not enough information to determine conclusively whether a problem exists, then proceed to 708 for collection of statistics. If it is determined in 710 that there are no problems with database objects, then thresholds are analyzed and adjusted in 712, and object usage is again monitored in 702.

In 714, determine the services needed to satisfy the problem. In 716, determine whether the service request creates additional problems. If so, return to 704 for problem identification. If not, then report the condition and potential resolution to the user in 720 by generating a report 722.

In 724, determine if the user wants to fix the problem(s) as outlined in the report 722. If so, proceed to 752 of FIG. 7b. If not, return to 702 and continue to monitor the database objects.

FIG. 7b illustrates a execution phase of the database management method. In 752, determine the tasks needed to perform the recommended services. In 754, determine if redundant tasks have been identified, and if not, identify a preferred task for each set of redundant tasks in 756.

In 758, build an executable workload and generate a workload report 760 and suitable JCL 628. In 762, determine if the Object Advisor is to manage the work. If not, proceed to 702 of FIG. 7a and continue to monitor the database objects. If so, schedule the workload in 764. In 766, submit and control the jobs in the workload. In 768, monitor the workload.

FIGS. 8 Through 14—Various Database Management Methods

FIGS. 8 through 14 illustrate various database management methods according to various embodiments of the invention.

Figure 8:
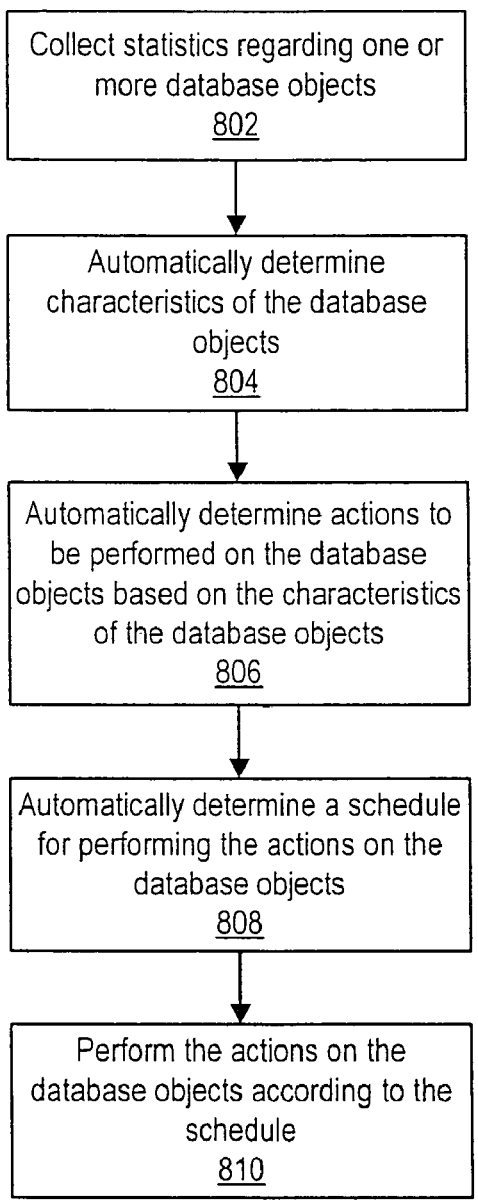
FIG. 8 is a flowchart illustrating a database management system and method which collects statistics and automatically determines and schedules appropriate actions based on the statistics according to one embodiment.

FIG. 8 is a flowchart illustrating a database management system and method which collects statistics and automatically determines and schedules appropriate actions based on the statistics according to one embodiment. In one embodiment, statistics relating to operation of a database may be collected, wherein the database comprises one or more database objects, in 802. The statistics may include, for example, object-level statistics and/or activity-level statistics. In 804, characteristics of the database objects may be automatically determined. In one embodiment, automatically determining characteristics of the database objects may include automatically determining characteristics of the database objects using the collected statistics, one or more policies, and/or one or more definitions. The policies and definitions may be defaults or may be customized by a user. In 806, actions to be performed on the database objects may be automatically determined based on the automatically determined characteristics of the database objects. A schedule for performing the actions on the database objects may be automatically determined in 808. In one embodiment, in 810, the actions may be performed on the database objects based on the schedule. The performing the actions on the database objects may be confirmed. The results of the actions on the database objects may be analyzed or monitored. In one embodiment, policies and/or definitions may be reconfigured based on the analyzing the results of the performing the scheduled actions on the database objects.

Figure 9:
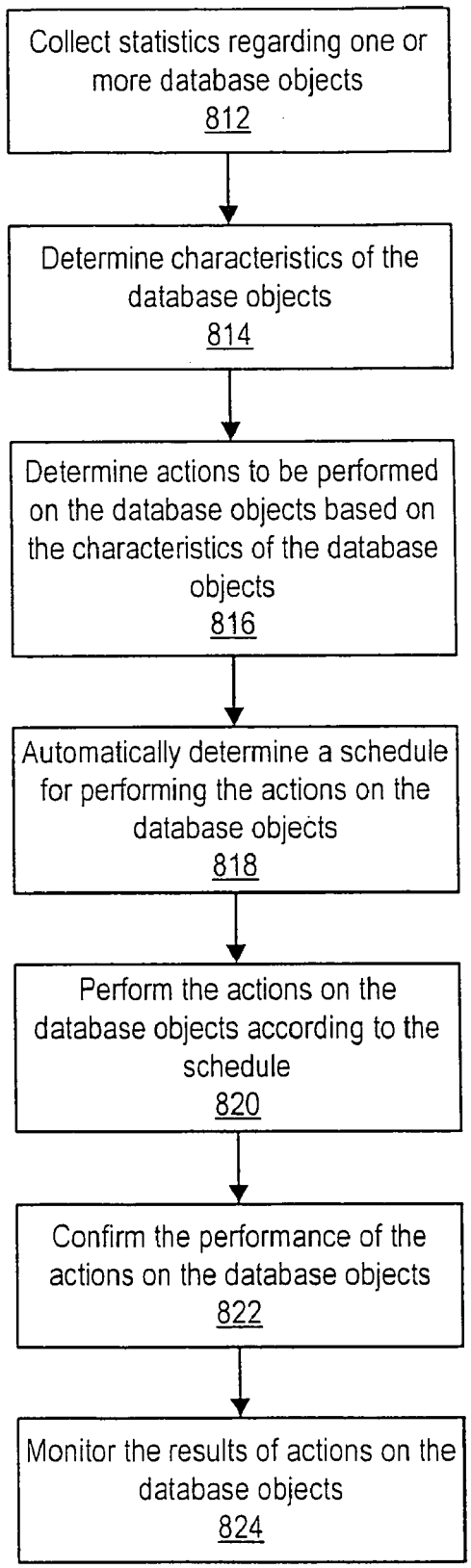
FIG. 9 is a flowchart illustrating a database management system and method which automatically schedules and performs actions and monitors results according to one embodiment.

FIG. 9 is a flowchart illustrating a database management system and method which automatically schedules and performs actions and monitors results according to one embodiment. In one embodiment, in 812, statistics relating to operation of a database may be collected, wherein the database comprises one or more database objects. Characteristics of the database objects may be determined either automatically or by intervention of a user in 814. Actions to be performed on the database objects may be determined, either automatically or by intervention of a user, based on the characteristics of the database objects in 816. A schedule for performing the actions on the database objects may be automatically determined in 818. In one embodiment, the actions may be performed on the database objects based on the schedule in 820. The performing the actions on the database objects may be confirmed in 822. In 824, in one embodiment, the results of the actions on the database objects may be analyzed or monitored. In one embodiment, policies and/or definitions may be reconfigured based on the analyzing the results of the performing the scheduled actions on the database objects.

Figure 10:
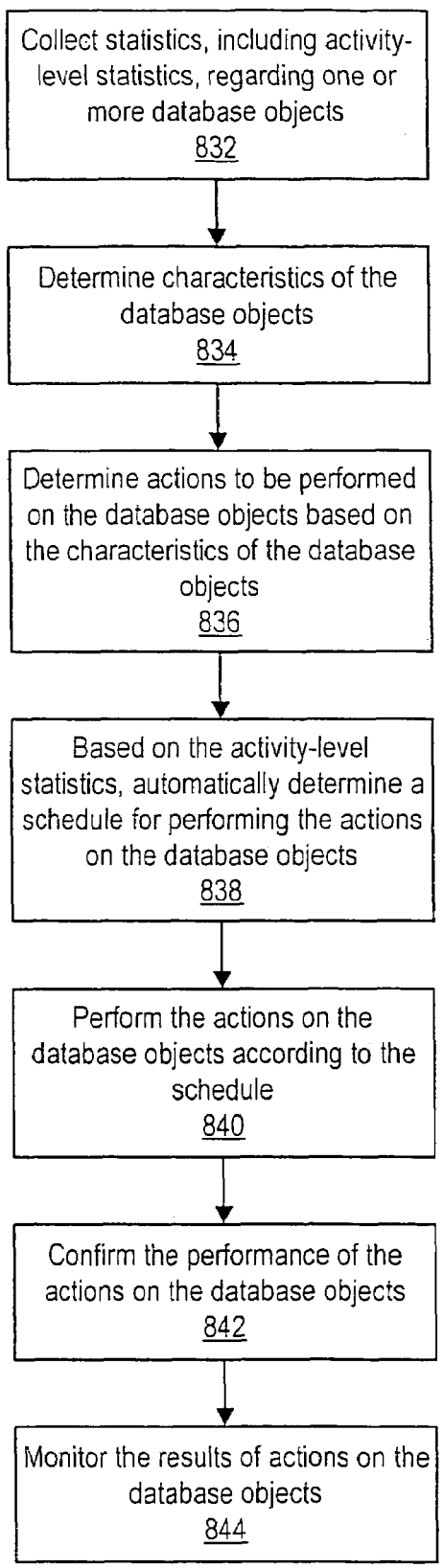
FIG. 10 is a flowchart illustrating a database management system and method which monitors activity levels and determines appropriate schedule times according to one embodiment.

FIG. 10 is a flowchart illustrating a database management system and method which monitors activity levels and determines appropriate schedule times according to one embodiment. In one embodiment, statistics relating to operation of a database may be collected, wherein the database comprises one or more database objects, in 832. The statistics may include, for example, activity-level statistics. The activity-level statistics may measure a level of activity or usage of the one or more database objects. In 834, characteristics of the database objects may be determined either automatically or by intervention of a user. In 836, actions to be performed on the database objects may be determined, either automatically or by intervention of a user, based on the characteristics of the database objects. In 838, a schedule for performing the actions on the database objects may be automatically determined based on the activity-level statistics. In one embodiment, the actions may be performed on the database objects based on the schedule in 840. In 842, the performing the actions on the database objects may be confirmed. The results of the actions on the database objects may be analyzed or monitored in 844.

Figure 11:
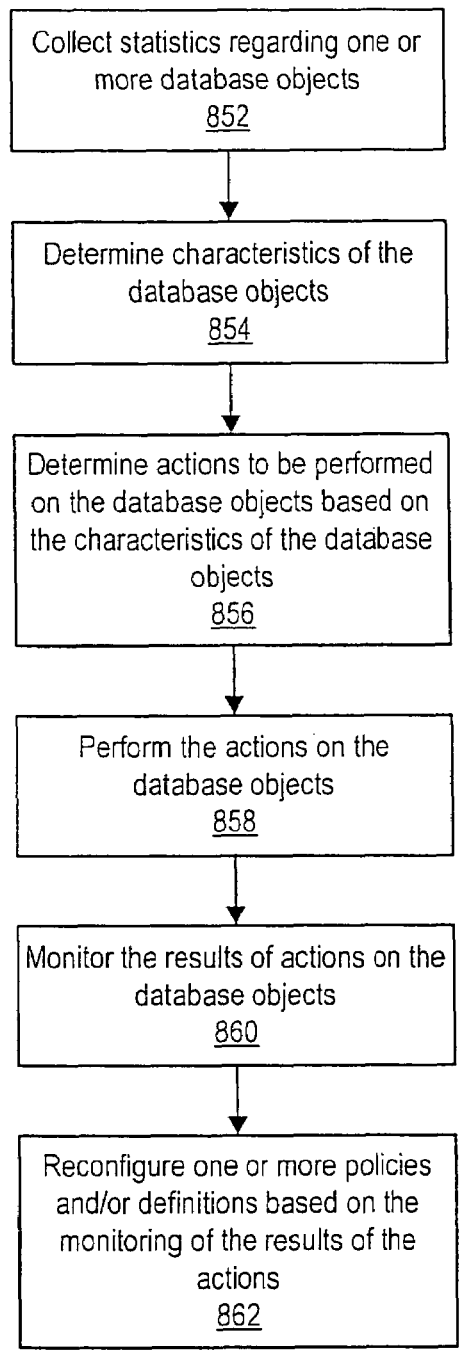
FIG. 11 is a flowchart illustrating a database management system and method which monitors action results and adjusts user parameters in response according to one embodiment.

FIG. 11 is a flowchart illustrating a database management system and method which monitors action results and adjusts user parameters in response according to one embodiment. In one embodiment, in 852, statistics relating to operation of a database may be collected, wherein the database comprises one or more database objects. In 854, characteristics of the database objects may be determined either automatically or by intervention of a user. In 856, actions to be performed on the database objects may be determined, either automatically or by intervention of a user, based on the characteristics of database objects. The actions may be performed on the database objects based on the schedule in 858. In 860, the results of the actions on the database objects may be analyzed or monitored. One or more policies or definitions may be reconfigured based on the monitoring the results of the performing the actions on the database objects in 862.

Figure 12:
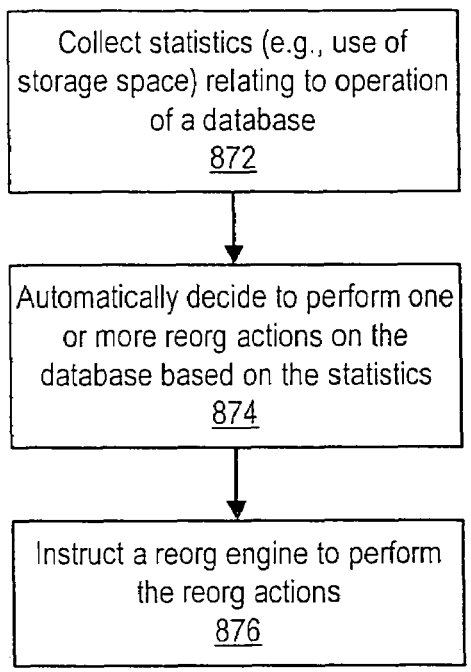
FIG. 12 is a flowchart illustrating a database management system and method which determines space efficiency of objects and initiates database reorganizations according to one embodiment.

FIG. 12 is a flowchart illustrating a database management system and method which determines space efficiency of objects and initiates database reorganizations according to one embodiment. In one embodiment, in 872, statistics relating to operation of a database may be collected, wherein the database comprises one or more database objects, and wherein the statistics comprise statistics regarding use of storage space by the database objects. The system and method may automatically decide to perform one or more REORG actions on the database objects based on the statistics in 874. In 876, a REORG engine may be instructed to perform the REORG actions.

Figure 13:
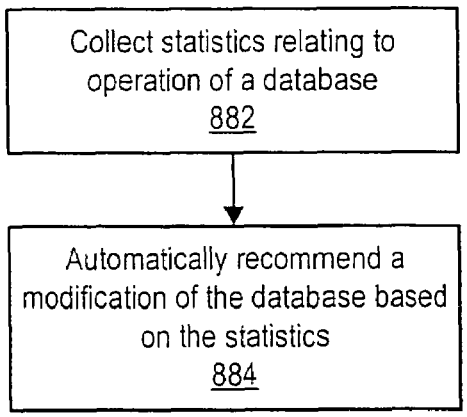
FIG. 13 is a flowchart illustrating a database management system and method which recommends changes in physical characteristics of objects and in partitions according to one embodiment.

FIG. 13 is a flowchart illustrating a database management system and method which recommends changes in physical characteristics of objects and in partitions according to one embodiment. In one embodiment, statistics relating to operation of a database may be collected, wherein the database comprises one or more database objects, in 882. A recommendation of a modification to one or more of the database objects may be generated based on the statistics in 884. The modification may include, for example, a new partition, a new key, or a another physical change to one of the database objects. The recommended modification may then be performed on one or more of the database objects.

Figure 14:
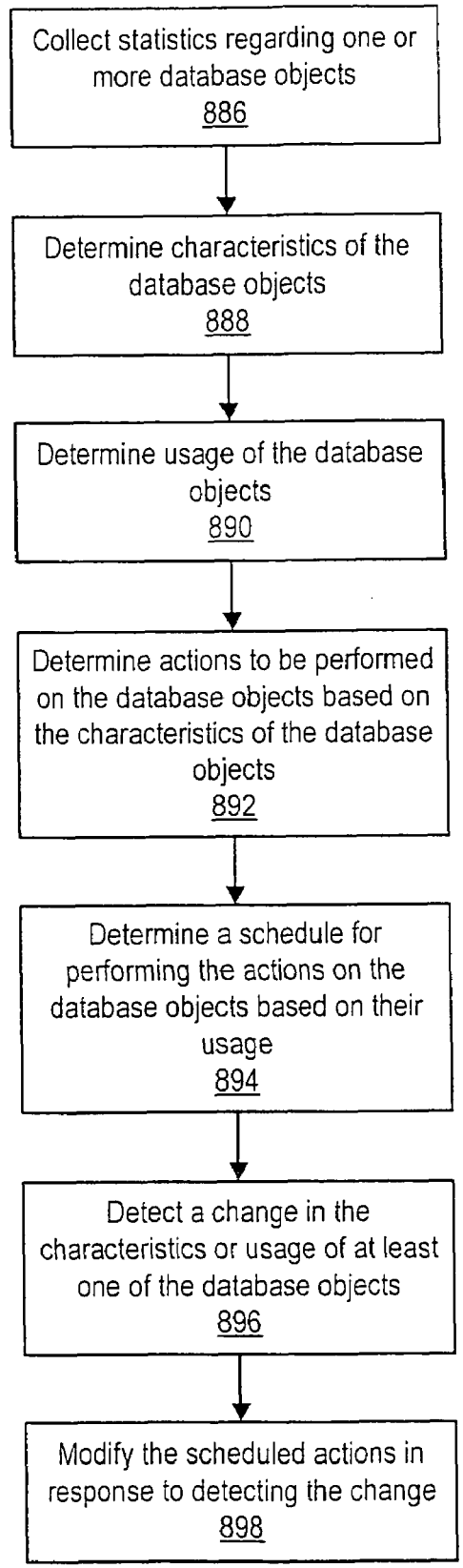
FIG. 14 is a flowchart illustrating a database management system and method which performs adaptive management of database objects according to one embodiment.

FIG. 14 is a flowchart illustrating a database management system and method which performs adaptive management of database objects according to one embodiment. In one embodiment, statistics relating to operation of a database may be collected, wherein the database comprises one or more database objects, in 886. Characteristics and usage of the database objects may be determined in 888 and 890. In 892, actions to be performed on the database objects may be determined based on the characteristics of the database objects. In 894, a schedule for performing the actions on the database objects may be determined based on the usage of the database objects. In 896, a change may be detected in the characteristics or usage of at least one of the database objects. The scheduled actions may be modified as a result of the change in the characteristics or usage of at least one of the database objects in 898.

Various embodiments further include receiving or storing instructions and/or data implemented in accordance with the foregoing description upon a carrier medium. Suitable carrier mediums include storage mediums or memory mediums such as magnetic or optical media, e.g., disk or CD-ROM, as well as signals such as electrical, electromagnetic, or digital signals, conveyed via a communication medium such as networks 202 and 204 and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A database management method comprising:
    collecting statistics relating to operation of a database, the database comprising one or more database objects, the statistics comprising activity-level statistics that measure a level of activity of the one or more database objects;
    determining characteristics of the database objects;
    determining actions to be performed on the database objects based on the characteristics of the database objects;
    automatically determining a schedule for performing the actions on the database objects, wherein the schedule is based on the activity-level statistics; and
    performing the actions on the database objects based on the schedule.

2. The database management method of claim 1, wherein the statistics comprise object-level statistics.

3. The database management method of claim 1, wherein the act of determining the characteristics of the database objects comprises determining the characteristics of the database objects using the collected statistics.

4. The database management method of claim 1, wherein the act of determining the characteristics of the database objects comprises determining the characteristics of the database objects using one or more policies.

5. The database management method of claim 4, further comprising allowing a user to customize the one or more policies.

6. The database management method of claim 1, wherein the act of determining the characteristics of the database objects comprises determining the characteristics of the database objects using one or more definitions.

7. The database management method of claim 6, further comprising allowing a user to customize the one or more definitions.

8. The database management method of claim 1, further comprising confirming the performing the actions on the database objects.

9. The database management method of claim 1, further comprising monitoring results of the performing the actions on the database objects.

10. The database management method of claim 9, further comprising analyzing the results of the performing the actions on the database objects.

11. The database management method of claim 10, further comprising reconfiguring one or more policies based on the analyzing the results of the performing the scheduled actions on the database objects.

12. The database management method of claim 1, wherein the act of determining the characteristics of the database objects comprises automatically determining the characteristics of the database objects.

13. The database management method of claim 1, wherein the act of determining the actions to be performed on the database objects based on the characteristics of the database objects comprises automatically determining the actions to be performed on the database objects based on the characteristics of the database objects.

14. The database management method of claim 1, wherein the act of performing the actions on the database objects based on the schedule comprises automatically performing the actions on the database objects based on the schedule.

15. A carrier medium comprising program instructions, wherein the program instructions are computer-executable to implement:
    collecting statistics relating to operation of a database, the database comprising one or more database objects, the statistics comprising activity-level statistics that measure a level of activity of the one or more database objects;
    determining characteristics of the database objects;
    determining actions to be performed on the database objects based on the characteristics of the database objects;
    automatically determining a schedule for performing the actions on the database objects, wherein the schedule is based on the activity-level statistics; and
    performing the actions on the database objects based on the schedule.

16. The carrier medium of claim 15, wherein the statistics comprise object-level statistics.

17. The carrier medium of claim 15, wherein the act of determining the characteristics of the database objects comprises determining the characteristics of the database objects using the collected statistics.

18. The carrier medium of claim 15, wherein the act of determining the characteristics of the database objects comprises determining the characteristics of the database objects using one or more policies.

19. The carrier medium of claim 18, wherein the program instructions are further computer-executable to implement customizing the one or more policies.

20. The carrier medium of claim 15, wherein the act of determining the characteristics of the database objects comprises determining the characteristics of the database objects using one or more definitions.

21. The carrier medium of claim 20, wherein the program instructions are further computer-executable to implement customizing the one or more definitions.

22. The carrier medium of claim 15, wherein the program instructions are further computer-executable to implement confirming the performing the actions on the database objects.

23. The carrier medium of claim 15, wherein the program instructions are further computer-executable to implement monitoring results of the performing the actions on the database objects.

24. The carrier medium of claim 23, wherein the program instructions are further computer-executable to implement analyzing the results of the performing the actions on the database objects.

25. The carrier medium of claim 24, wherein the program instructions are further computer-executable to implement reconfiguring one or more policies based on the analyzing the results of the performing the scheduled actions on the database objects.

26. The carrier medium of claim 15, wherein the act of determining the characteristics of the database objects comprises automatically determining the characteristics of the database objects.

27. The carrier medium of claim 15, wherein the act of determining the actions to be performed on the database objects based on the characteristics of the database objects comprises automatically determining the actions to be performed on the database objects based on the characteristics of the database objects.

28. The carrier medium of claim 15, wherein the act of performing the actions on the database objects based on the schedule comprises automatically performing the actions on the database objects based on the schedule.

29. A database management system comprising: a CPU;
a database coupled to the CPU, wherein the database comprises one or more database objects;
a memory coupled to the CPU, wherein the memory stores program instructions which are executable by the CPU to:
collect statistics relating to operation of the database, wherein the statistics comprise activity-level statistics that measure a level of activity of the one or more database objects;
determine characteristics of the database objects;
determine actions to be performed on the database objects based on the characteristics of the database objects;
automatically determine a schedule for performing the actions on the database objects, wherein the schedule is based on the activity-level statistics; and
perform the actions on the database objects based on the schedule.

30. The database management system of claim 29, wherein the statistics comprise object-level statistics.

31. The database management system of claim 29, wherein in the act of determining the characteristics of the database objects, the program instructions are further executable by the CPU to determine the characteristics of the database objects using the collected statistics.

32. The database management system of claim 29, wherein in the act of determining the characteristics of the database objects, the program instructions are further executable by the CPU to determine the characteristics of the database objects using one or more policies.

33. The database management system of claim 32, wherein the program instructions are further executable by the CPU to customize the one or more policies.

34. The database management system of claim 29, wherein in the act of determining the characteristics of the database objects, the program instructions are further executable by the CPU to determine the characteristics of the database objects using one or more definitions.

35. The database management system of claim 34, wherein the program instructions are further executable by the CPU to customize the one or more definitions.

36. The database management system of claim 29, wherein the program instructions are further executable by the CPU to confirm the performing the actions on the database objects.

37. The database management system of claim 29, wherein the program instructions are further executable by the CPU to monitor results of the performing the actions on the database objects.

38. The database management system of claim 37, wherein the program instructions are further executable by the CPU to analyze the results of the performing the actions on the database objects.

39. The database management system of claim 38, wherein the program instructions are further executable by the CPU to reconfigure one or more policies based on analyzing the results of the performing the scheduled actions on the database objects.

40. The database management system of claim 29, wherein in the act of determining the characteristics of the database objects, the program instructions are further executable by the CPU to automatically determine the characteristics of the database objects.

41. The database management system of claim 29, wherein in the act of determining the actions to be performed on the database objects based on the characteristics of the database objects, the program instructions are further executable by the CPU to automatically determine the actions to be performed on the database objects based on the characteristics of the database objects.

42. The database management system of claim 29, wherein in the act of performing the actions on the database objects based on the schedule, the program instructions are further executable by the CPU to automatically perform the actions on the database objects based on the schedule.

* * * * *